United States Patent [19]

Ogden

[11] 4,052,040
[45] Oct. 4, 1977

[54] CUTTING TORCH AND GUIDE ASSEMBLY

[76] Inventor: Ralph Ogden, 1304 Fisher St., Munster, Ind. 46321

[21] Appl. No.: 701,368

[22] Filed: June 30, 1976

[51] Int. Cl.² .............................................. B23K 7/10
[52] U.S. Cl. ....................................... 266/68; 266/76
[58] Field of Search ................................... 266/68, 76

[56] References Cited

U.S. PATENT DOCUMENTS

| 2,249,413 | 7/1941 | Bechtle et al. | 266/76 |
| 2,766,982 | 10/1956 | Bechtle et al. | 266/76 |
| 3,595,545 | 7/1971 | Sitnichenko et al. | 266/76 |
| 3,980,126 | 9/1976 | Eberle | 266/68 X |

FOREIGN PATENT DOCUMENTS

| 534,714 | 1941 | United Kingdom | 266/76 |
| 546,098 | 1942 | United Kingdom | 266/76 |

*Primary Examiner*—Roy Lake
*Assistant Examiner*—Paul A. Bell
*Attorney, Agent, or Firm*—McWilliams & Mann

[57] ABSTRACT

A cutting torch apparatus comprising a cutting torch arranged to be mounted on a movable frame for movement over the workpiece with the torch comprising a torch body and support therefore integrated into a double acting hydraulic cylinder and piston device in which the torch body is equipped as a piston and is reciprocably mounted in a cylinder through which the torch body extends to dispose the torch nozzle for application to the workpiece. The torch body is equipped with a feeler or guide member mounted for a lost motion movement range axially of the nozzle and having a plurality of feeler elements in coplanar relation that ride on the workpiece in spaced apart relation about the nozzle. The piston and cylinder device are incorporated in a hydraulic system, that includes a hydraulic pressure liquid and a hydraulic pressure liquid flow orienting or directional control valve of the mechanical servo type, for supporting the torch body and moving same axially of its nozzle. The feeler member and servo valve are operably connected for translating the movement of the feeler member in its lost motion range, due to elevational changes in the workpiece, as the torch moves across same, into adjustment of the servo valve to maintain the torch nozzle at the desired predetermined spacing above the workpiece, as the cutting proceed.

8 Claims, 10 Drawing Figures

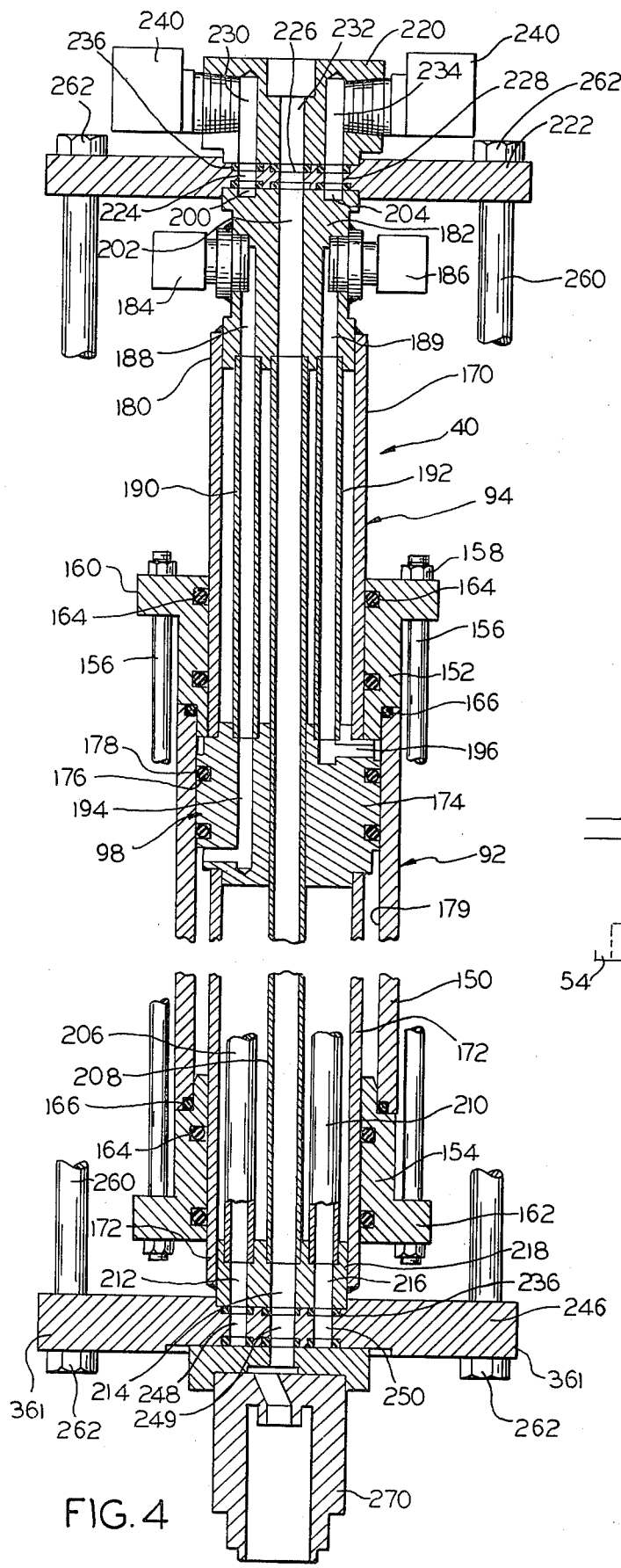
FIG. 4
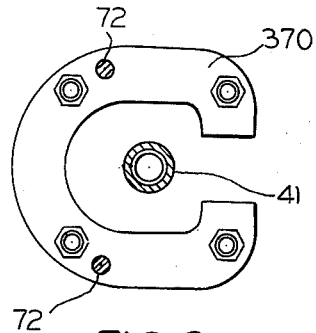
FIG. 3
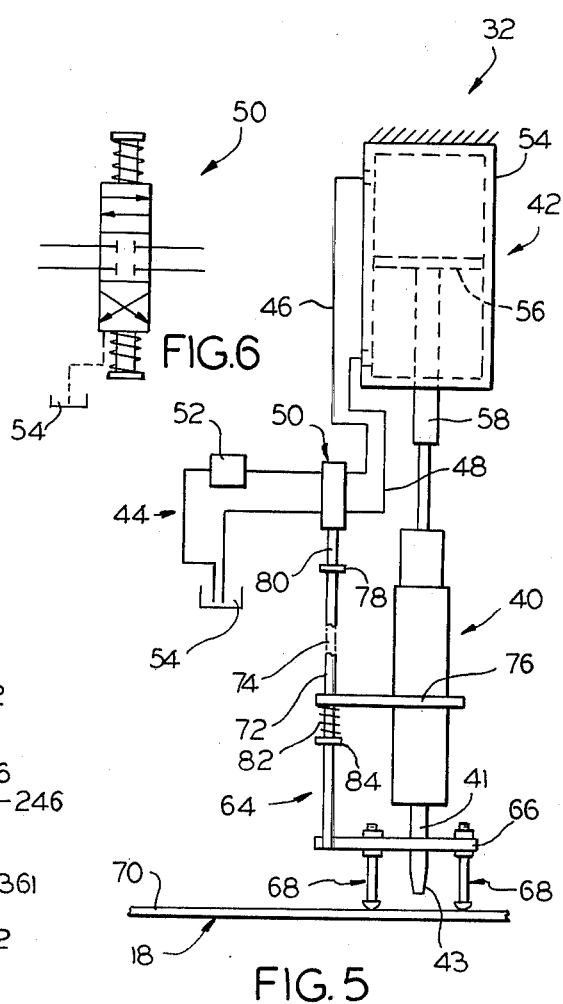
FIG. 6
FIG. 5

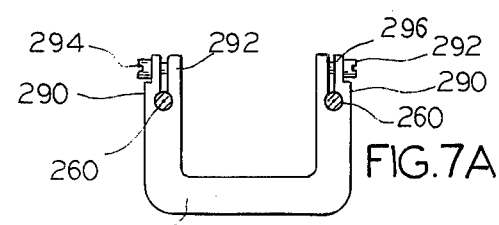
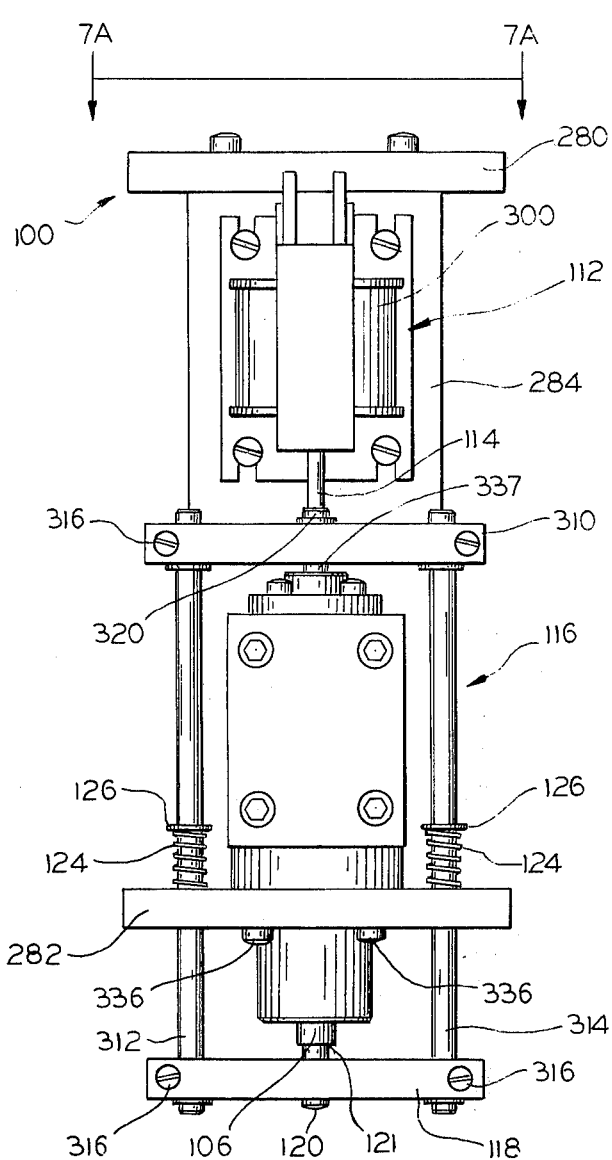
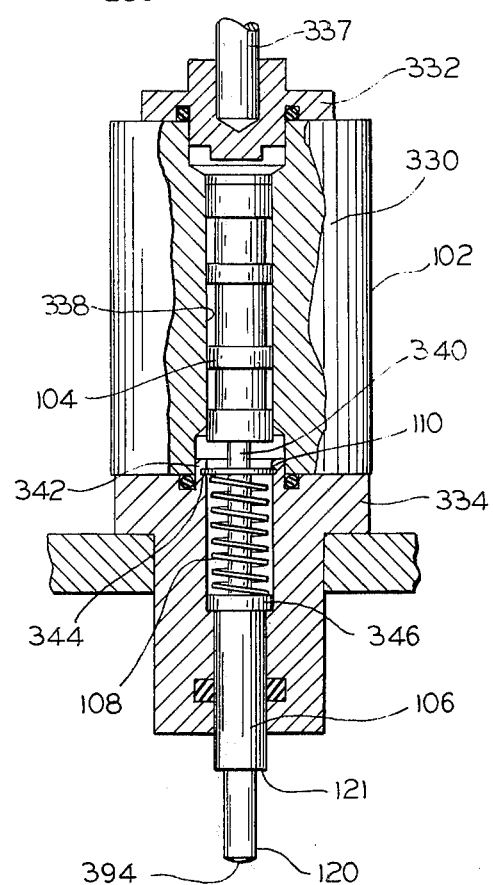
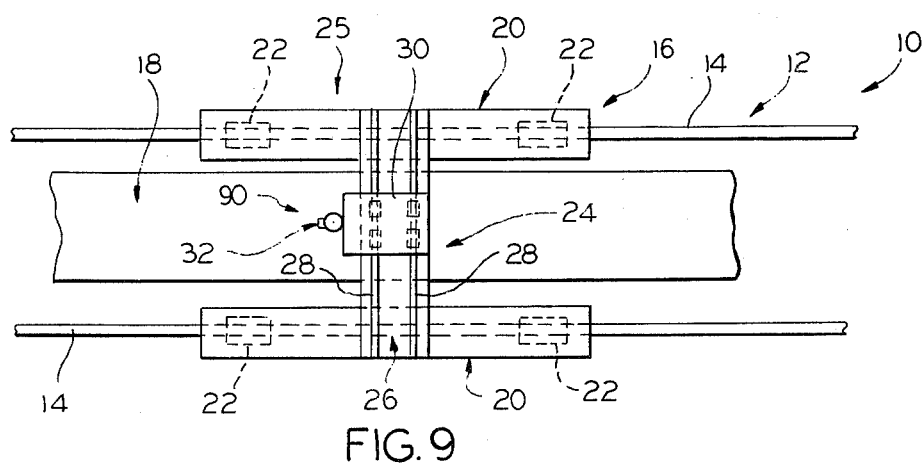

CUTTING TORCH AND GUIDE ASSEMBLY

This Invention relates to a cutting torch and guide assembly, and more particularly, to a cutting torch arrangement wherein the torch nozzle is maintained at a predetermined spacing or elevation above the workpiece as flame cutting proceeds, even though the workpiece may be warped or for other reasons have an uneven or undulating surfacing.

It is well known in the art of torch cutting metals that the nozzle of a cutting torch, for effective cutting purposes, should be maintained at a constant optimum spacing or elevation above the workpiece. For instance, flame cutting practices usually involve the workpiece being more or less horizontally disposed with the torch mounted on a frame that is moved over the workpiece during the cutting procedure. The nozzle spacing employed in any given situation is usually set before cutting begins, and is determined by such factors as the flame forming constituents to be used, and the thickness of the workpiece.

However, during cutting, warping of the workpiece may occur, and the workpiece as supported is usually not perfectly parallel with the machine elements. Thus, adjustment of the nozzle spacing can be and usually is a continual need during the cutting procedure.

A number of guide arrangements have been devised as the result of efforts to solve this problem. Among these are mechanical devices employing a wheel that rides on one side or the other of the nozzle; these devices are thus not too reliable as they are single sided in application and have only a single point or line contact with the workpiece. Motorized guide systems are common, but usually involve complicated electrical circuitry that significantly adds to basic costs and maintenance problems. Air systems exist but are not widely used because of practical difficulties in operation.

A principal object of this invention is to provide a cutting torch and guide assembly in which torch nozzle height adjustment is automatically effected utilizing a feeler or guide arrangement that is free of the weight of the torch, and has a multiposition contact with the workpiece in uniform spacing about the nozzle for maximized sensing or feeling capability.

Another principal object of the invention is to provide a cutting torch and guide assembly including a hydraulic system for supporting the torch and automatic adjustment of the nozzle in which a freely movable feeler or guide mechanism is provided, having a lost motion movement range, that is operably connected to the hydraulic system to translate movement of the feeler in its lost motion range, due to elevational changes in the workpiece surfacing contacted, into adjustment of the nozzle height, relative to the workpiece.

Other objects of the invention are to integrate the torch into a hydraulic double acting cylinder and piston device for full control of the support of the torch and automatic adjustment of the nozzle height, to provide a feeler or guide device that is free of the weight of the torch insofar as engagement with the workpiece is concerned, and that has multiple position contact about the nozzle, and to provide a cutting torch and guide assembly that is economical of manufacture, convenient to install and use, adapted for both flame and plasma cutting equipment, and long lived and facile in operation.

In accordance with the present invention, the cutting apparatus and guide assembly comprises a torch body and support therefore integrated into a double acting hydraulic cylinder and piston device in which the torch body is equipped as a piston and is reciprocably received in a cylinder through which the torch body extends to dispose the torch nozzle for application to the workpiece. The cylinder is arranged for mounting on the usual movable frame for convenient flame torch application of the apparatus to the workpiece.

The torch body is equipped with a feeler or guide member mounted for a lost motion movement range axially or longitudinally of the nozzle and having a plurality of feeler elements in coplanar relation that ride on the workpiece in spaced apart relation about the nozzle for multiple position contact with the workpiece thereabout.

The piston and cylinder device are incorporated in a hydraulic system that includes a hydraulic pressure liquid and a hydraulic pressure liquid flow orienting or directional control valve of the mechanical servo type, for supporting the torch body from the cylinder and moving same axially or longitudinally of its nozzle between operative and inoperative positions. The feeler or guide member and servo valve are operably connected for translating movement of the feeler or guide member in its lost motion range, due to elevational changes in the workpiece, into adjustment of the servo valve to maintain the nozzle at a predetermined spacing above the workpiece, as the flame cutting proceeds.

Other objects, uses, and advantages will be obvious or become apparent from a consideration of the following detailed description and the application drawings in which like reference numerals indicate like parts throughout the several views.

In the drawings:

FIG. 3 is a fragmental cross-sectional view substantially along line 3—3 of FIG. 2, better illustrating the general nature of the feeler engagement with the workpiece amd about the torch nozzle;

FIG. 4 is a diagrammatic vertical sectional view through the torch body and associated parts, with parts being broken away for a better diagrammatic illustration of the torch body and associated parts;

FIG. 5 is a schematic diagram in largely block diagram form illustrating the general nature of the invention;

FIG. 6 is a diagram illustrating the general nature of the hydraulic pressure liquid flow orienting valve employed in connection with the invention;

FIG. 7 is a diagrammatic view substantially along line 7—7 of FIG. 2;

FIG. 7A is a fragmental view substantially along line 7A—7A of FIG. 7;

FIG. 8 is a diagrammatic sectional view largely in block diagram form illustrating the general nature of the hydraulic pressure liquid flow orienting valve employed in connection with the invention; and FIG. 9 is a diagrammatic plan view illustrating a typical application of the invention for flame cutting procedures.

Figure 1:
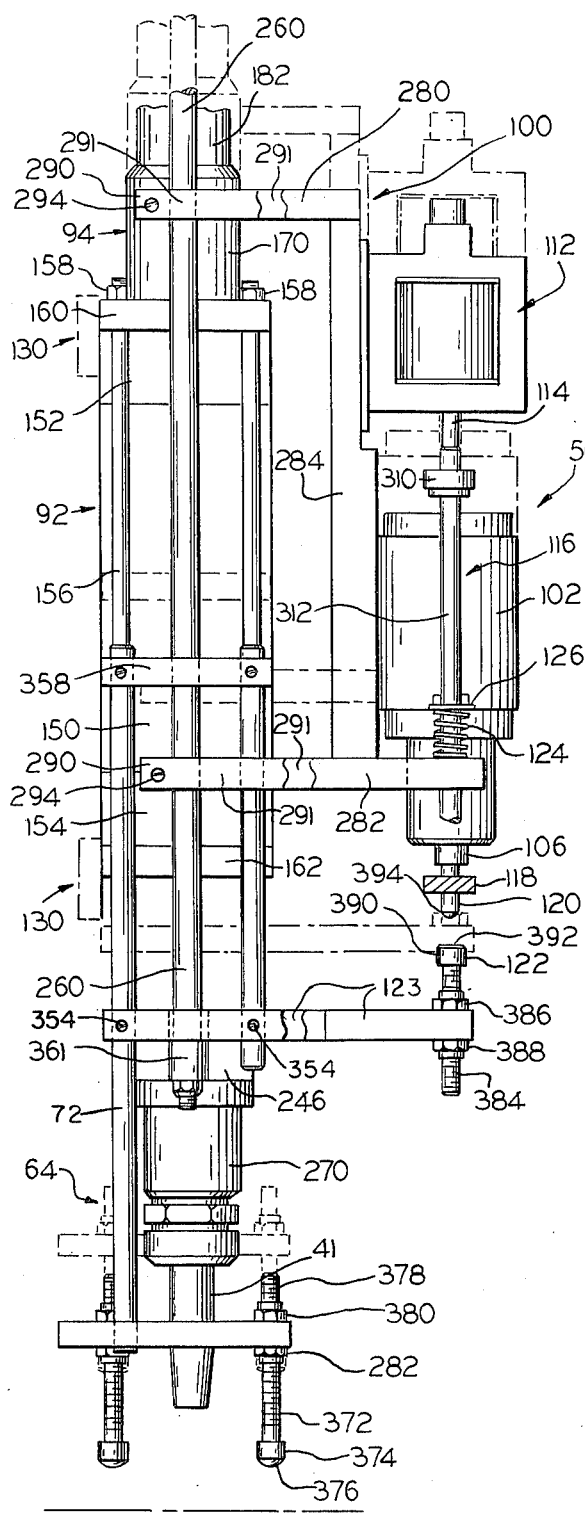
FIG. 1 is a side elevational view of one embodiment of the invention, as applied to flame cutting equipment, with the device shown largely in block diagram form and with the torch body partially retracted from the workpiece in its inoperative position and the full retracted position being indicated in broken lines.

However, it is to be distinctly understood that the specific drawing illustrations provided are supplied primarily to comply with the requirements of the Patent Laws, and that the invention is susceptible of other embodiments which will be obvious to those skilled in the art, and which are intended to be covered by the appended claims.

GENERAL DESCRIPTION

Referring first to the generalized FIG. 9, reference numeral 10 generally indicates a flame cutting apparatus as a whole, which comprises a trackway 12 defined by a pair of track rails 14 on which rides a gantry type flame cutting machine generally indicated at 16, which is arranged for flame cutting of a metal plate 18 suitably supported between the track rails 14 in a horizontal position, in accordance with conventional procedures.

The flame cutting machine, which is only diagrammatically illustrated and is intended only to be representative of a familiar type of basic flame cutting machinery, is shown to comprise a pair of trucks 20 each having a pair of wheels 22 of the usual flange type for riding on the rails 14. The trucks 20 are connected together by a bridge structure 24 to form a wheeled frame 25 on which is mounted a trackway 26 defined by suitable rails 28 (shown applied to bridge 24) on which rides a trolley or carriage 30 that operably mounts a flame cutting torch and guide assembly generally indicated by reference numeral 32. The frame 25 and trolley 30 are assumed to be suitably powered for movement along their respective trackways.

The assembly 32 is schematically outlined in FIG. 5 and is shown to comprise a torch 40 equipped with nozzle or cutting tip 41 and supported by double acting hydraulic cylinder device 42 that is incorporated in a hydraulic system 44 including hydraulic supplying conduits 46 and 48 that connect between the device 42 and a four way servo control valve 50, which is of the general type indicated in FIG. 6, which receive hydraulic pressure liquid from a suitable source, such as conventional hydraulic pump 52, and returns the hydraulic pressure liquid to tank 54.

The device 42 for illustrative purposes is shown to be a diagrammatically illustrated hydraulic cylinder 54 having reciprocably mounted in same piston 56 having its piston rod 58 suitably connected to torch 40 for suspending the torch 40 for application to workpiece 18. For purposes of disclosure simplification the usual suitable movement guides for torch 40 are omitted from the diagrammatic illustration of FIG. 5.

The torch 40, in accordance with the invention, has operably associated therewith a feeler or guide member 64 in the form of a frame member 66 that is shaped as indicated in FIG. 3 and is disposed about the usual torch nozzle 41 and mounts a plurality of feelers 68 in spaced apart relation about the nozzle 41 that ride on the top surface 70 of the workpiece 18.

The feeler or guide member 64 in the form shown in FIG. 5 includes a pair of upright rod members 72 and 74 that are slidably received through a brace member 76 that is fixed with respect to the torch 40. Members 72 and 74 for purposes of illustration are joined together by cross member 78 that is secured to the spool valve member 80 of the directional flow control valve 50.

In the diagrammatic showing of FIG. 5, the guide or feeler member 64 is biased in the direction of workpiece 70 by suitable compression springs 82 interposed between spring seats 84 and the brace member 76, and, of course, does not support the weight of torch 40.

In accordance with the invention, when flame cutting of the plate 18 is to commence, the torch 40 is disposed, using the hydraulic cylinder device 42, to space the discharge end 43 of nozzle 41 at the desired spacing from the upper surface 70 of the workpiece 18; this spacing is determined in the usual manner in accordance with the circumstances of the flame cutting operation to be commenced. Valve 50 is operated to achieve the positioning of the torch 40 that is desired, with the result being that when the apparatus is disposed as generally indicated in FIG. 5, the feelers 68 will rest on the workpiece under the weight of member 64 and the bias of spring 82, but free of the weight of the torch 40.

The feelers 68 are mounted on the frame 66 for adjustment longitudinally of the nozzle 41, and by appropriately adjusting the feeler 68 lengthwise of the nozzle 41, the apparatus 32 may be set so that the valve 50 will be in its null position when the discharge end 43 of the nozzle is at the desired elevation above surface 70 of workpiece 60.

As flame cutting starts and proceeds, the wheeled frame 25 moves longitudinally of the trackway 12 in the usual manner with trolley 30 being stationary or moved longitudinally of the bridge 24 in any suitable manner, as dictated by the needs of the flame cutting operation.

As the torch 40 moves relative to the workpiece the feelers 68 ride along the workpiece surface 70. As long as there is no elevational change of the workpiece surface 70, the valve 50 remains at its null position. However, as the surface of the workpiece dips or rises, the feelers 68 and thus feeler member 64 follow same, whereby the feeler or guide member 64 moves downwardly or upwardly to correspondingly shift the valve support 50 to one side or the other of its null position whereby the torch 40 and consequently its nozzle 41 are shifted accordingly to maintain the desired spacing of the nozzle tip 43 above the workpiece surface 70.

In the specific embodiment of the invention illustrated in FIGS. 1 – 4, 7 and 8 of the application, the torch and guide assembly 32 comprises torch 40 integrated with hydraulic cylinder and piston device 42 to form integrated assembly 90 in which cylinder structure 92 receives the torch 40, with the latter being formed to define a torch body 94 that extends through and lengthwise of the cylinder structure 92 that is equipped with a piston structure 98 (see FIG. 4) for reciprocating the torch body 94 with respect to the cylinder structure 92.

The torch body 94, which is diagrammatically illustrated in FIG. 4, is formed to define passages therethrough for communicating the usual flame supporting gaseous components to the nozzle 41, as well as for communicating the hydraulic pressure fluid to either side of piston structure 98 that is disposed within cylinder structure 92.

The torch body 94 has secured thereto a rack 100 on which is mounted the hydraulic pressure liquid directional control or flow orienting valve 50, which in the form shown in the drawings comprises suitable spool valve 102 that is diagrammed in FIG. 6 and is of the mechanical servo type, one commercial example of which is the model CSVHS-400-S unit made and sold by Manatrol Division of Parker Hannifin Corp., Elyrin, Ohio.

As indicated in FIG. 8, wherein the valve 102 is diagrammatically illustrated, the valve spool member 104 is connected to actuator member 106 and spring biased downwardly of FIG. 8 by compression spring 108 acting between the plunger member 106 and a spring seat 110. As indicated in FIG. 6, valves of this type have their casings connected to tank to accommodate casing drainage in the null position.

The rack 100 also mounts a solenoid 112 having a plunger 114 which engages a yoke 116 slidably mounted on the rack 100 and having a cross member 118 which receives actuator 106, and specifically its reduced end portion 120 below the actuatorshoulder 121. The yoke 116 is biased upwardly by suitable compression springs 124 acting between the rack 100 and the spring seats 126 that are fixed with respect to the yoke 116.

The guide or feeler member 64 is mounted on cylinder structure 92 for free sliding movement with respect thereto to define its lost motion movement range. In the specific form shown in the drawings, the feeler member 64 includes and supports a support frame 123 adjustably mounting a seat or abutment 122 that is aligned with the actuator 106 of valve 102, in accordance with the invention.

The assembly 90 is suitably mounted on the wheeled frame 25 or other comparable structure for proper association with a workpiece 18, suitable framing being operably associated with the cylinder structure 92 where indicated at 130 for this purpose. The various components are arranged such that when the assembly 90 is in its inoperative position, the torch body 94 and guide or feeler member 64 will be withdrawn to the broken line position of FIG. 1, with the feeler member 64 resting on the torch body. Under these conditions, the solenoid 112 is inoperative, thereby permitting compression springs 124 to move yoke 116 upwardly whereby the yoke frame member 118 engages shoulder 121 of the valve actuator member 106 to move the valve spool 104 to its position in which the valve 102 is positioned to operate the hydraulic system to hold the torch body 94 in its elevated position of FIG. 1.

In this position the valve member actuator 106 will be spaced from the feeler or guide member abutment or seat 122.

Figure 2:
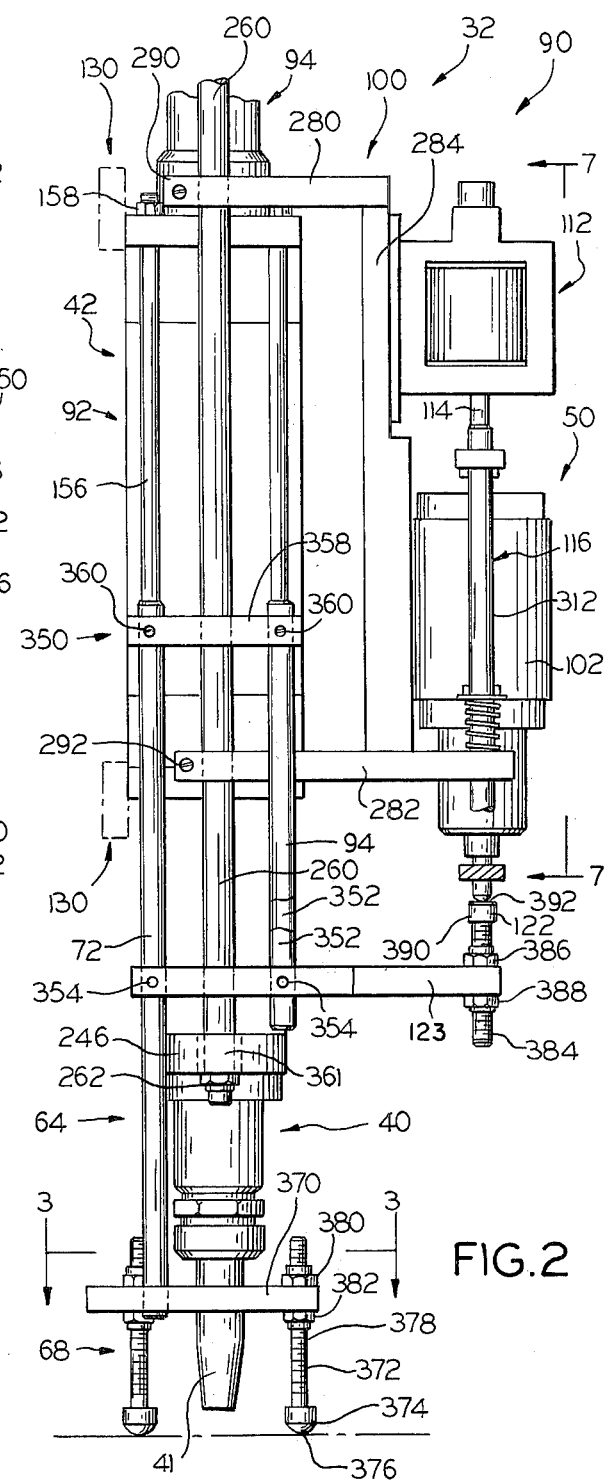
FIG. 2 is a view similar to that of FIG. 1, but showing the torch body and guide assembly applied to the workpiece for flame cutting procedures.
Figure 1A:
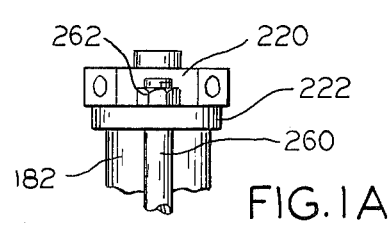
FIG. 1A is a fragmental elevational view showing the upper portion of the torch that is omitted from the showing of FIG. 1.

When the assembly 90 is to be moved to appropriate position for flame cutting purposes, the solenoid 112 is energized to drive plunger 114 downwardly against yoke 116 to move yoke 116 downwardly against the action of biasing springs 124 to permit the biasing spring 108 of the valve 102 to bias actuator 106 and spool valve 104 downwardly and to the other side of the null position of the spool 104 whereby the torch body 94 will be lowered to bring the nozzle 41 into adjacency with the workpiece and the feelers 68 into contact therewith, with the feeler member 64 being then freed from vertical support by the torch body 94 (see FIG. 2). For initial set up purposes, the feelers 68 and seat or abutment 122 are adjusted vertically to set the valve 102 at its null position when the discharge end 43 of the nozzle 41 has the desired spacing above the top surface 70 of the workpiece 18. In this position, the shoulder 121 of plunger 106 will be spaced above the cross member 118 of the yoke 116.

Assuming that the torch body 94 is connected to the usual sources of flame forming constituents, the flame is ignited in the usual manner and flame cutting proceeds, with the frame 25 and trolley 30 being moved as needed by the particular circumstances of the flame cutting operation to be made. Guide or feeler member 64 rides on the surface 70 of the workpiece 18, and through its association with the actuator 106 and abutment or seat 122, provides the means whereby movement of the guide or feeler member 64 in its lost motion range is translated into adjustment of the valve 102 to maintain the desired constant spacing of the nozzle discharge end 43 above the workpiece 60.

As indicated in FIG. 3, the feelers 68 are disposed about the nozzle 41 in uniformly spaced positioning with respect to same. While the number of feelers 68 employed is optional, the important thing is that the feelers 68 be disposed on either side of the nozzle 41 for multiple position contact with the workpiece whereby the guide or feeler member 64 can perform its guiding functions along edges of the workpiece as well as at positions spaced from the workpiece edges.

SPECIFIC DESCRIPTION

The general arrangement of the cylinder structure 92 and torch body 94 are diagrammatically illustrated in FIG. 4, wherein it will be seen that the cylinder structure 92 comprises a cylinder 150 that reciprocably receives the piston structure 98 and has its open ends closed by cylinder heads 152 and 154 clamped thereagainst by employing tie rods 156 and nuts 158 applied to the threaded ends of tie rods 156 to draw the respective cylinder heads against the cylinder ends as tie rods 156 are tensioned. For this purpose the cylinder heads 152 and 154 are formed to define the respective flanges 160 and 162 that are square in configuration to dispose the tie rods 156 at convenient corners of the cylinder heads which are, of course, aligned longitudinally of the cylinder for that purpose. Cylinder 150 and heads 152 and 154 are suitably recessed to receive suitable fluid seals 164 and 166 that may be of the illustrated O-ring type.

The torch body 94 in the specific form shown comprises a pair of tubular members 170 and 172 suitably fixed to either side of the piston structure 98, with the latter comprising a piston member 174 having its periphery suitably recessed as at 176 to receive suitable fluid seals 178 that may be of the illustrated O-ring type, for effecting a fluid seal between the piston member 174 and the internal surface 179 of cylinder 150.

The tubular member 170 at its end 180 has fixed thereto in leak free relation therewith a cap member 182 to which suitable fittings 184 and 186 are applied communicating with the respective passages 188 and 189 that are in turn in communication with the respective tubes 190 and 192 which are connected with the respective piston passages 194 and 196 that communicate with either side of the piston member 174 for effecting double acting hydraulic action of the cylinder structure 92 and torch body 94.

The cap 182 is also formed with passages 200, 202, and 204 that communicate with the respective conduits 206, 208 and 210 which communicate the flame supporting gases through the sleeve 170 and 172 and piston 174 at the lower end of the torch body for communication to corresponding passages 212, 214 and 216 formed in cap member 218 suitably fixed to the lower end of sleeve 172 in leak free relation thereto.

In the specific form illustrated, the fittings 184 and 186 are arranged for connection into the hydraulic system 44 that is generally illustrated in FIG. 5, and an adapter 220 is operably associated with the cap member 182 for connecting the respective sources of gas to the respective passages 200, 202 and 204. At cap 182 end of torch body 94, mounting plate 222, formed to define passages 224, 226 and 228 disposed for alignment with the respective passages 200, 202 and 204 of end cap 182 and the corresponding located passages 230, 232 and 234 of adapter member 220, is applied over the end of cap member 182 and receives the adapter member 220 that is secured in place (to mounting plate 222) employing suitable screws or the like (not shown). As indicated in FIG. 4, suitable O-ring seals 236 are applied between these parts for sealing purposes. The sources of the flame supporting gases are suitably connected to the adapter member 220 as by employing suitable fittings 240 and the usual hoses, etc.

At the lower end of the torch body, mounting plate 246 that is similar to plate 222 receives the cap member 218 that is formed with the respective passages 248, 249 and 250 for communicating the gases to the nozzle 41 in any conventional manner. The nozzle 41 may be of any suitable or conventional type and secured to the mounting member 246 in any suitable manner. Again, suitable O-ring seals 236 are employed for sealing purposes in the manner indicated in FIG. 4 with respect to the parts involved.

The mounting plates 222 and 246 are biased against the respective cap members 182 and 218 by employing tie rods 260 having the respective nuts 262 applied to the threaded ends thereof for tensioning the tie rods 260. As indicated in FIG. 1, the feeler member rests on mounting plate 246 when the apparatus is in its retracted relation.

In the form shown, nozzle 41 is applied to suitable adapter 270 suitably secured to the end plate 246, as by employing screws or the like which adapter 270 is formed in any conventional way for suitable application thereto of the nozzle 41 itself. The adapter 270 is shaped in any conventional way to effectuate the bringing together of the flame supporting constituents for passage through the nozzle during the flame cutting operation.

The rack 100 comprises an upper U-shaped frame member 280 and a lower U-shaped frame member 282 fixed to either end of elongate mounting frame member 284 to which the solenoid 112 and valve 102 are suitably secured. The rack 100 is fixed to the torch body 94, and in the illustrated embodiment, this is done by applying members 280 and 282 to the tie rods 260 on either side of the torch body. The frame members 280 and 282 are of similar arrangement, with the member 280 being specifically shown in FIG. 7A, wherein it is shown that the end portions 290 of the arms 291 of same are split or bifurcated to receive the respective tie rods 260 and define threaded portions 292 that receive the respective screws 294 that pass through the respective lug portions 296 for clamping the respective ends 290 of the member 280 to the tie rods 260. As indicated, the member 282 is similarly arranged.

The solenoid 112 may be any suitable commercially available unit having the usual coil 300 and plunger 114 which, in the form shown, is spring biased by the springs 124 to withdraw the plunger 114 from the extended position of FIGS. 2 and 7 to the broken line position of FIG. 1.

The rack frame member 282, in the form shown, slidably mounts the yoke 116, which comprises upper frame member 310 and lower frame member 118 suitably affixed to spaced apart slide rods 312 and 314, as by employing a clamping arrangement similar to that illustrated in FIG. 7A involving screws 316 that are comparable to screws 294 in function. Spring seats 126 are suitably fixed to the slide rods 312 and 314, with the respective compression springs 124 being received about the respective slide rods 312 and 314 between the rack frame member 282 and the respective spring seats 126, for biasing the yoke 116 in the direction of the solenoid 112. Alternately, yoke 116 may be mounted directly on valve 102.

The yoke upper frame member 310 carries a suitable seat 320 against which plunger 114 bears on energization of the solenoid 112 to lower the rack 116 to the lowered position of FIGS. 2 and 7.

As already indicated, the valve actuator member 106, and in particular its reduced end portion 120, extends freely through the yoke lower frame member 118 for engagement with the feeler member seat or abutment 122.

The valve 102 may be of any suitable commercially available arrangement providing the four way control functions indicated by FIG. 6 and in the form shown includes valve body 330 suitably secured between cap member 332 and base member 334, with the latter being received in the rack frame member 282 for securement thereto by screws 336. Cap 332 carries stud 337 on which the yoke upper frame member 310 reciprocates under the action of solenoid 112 and springs 124.

In the form shown, the valve body 330 defines the bore 338 in which the spool valve 104 operates, as well as the other conventional passageways essential for a servo valve of the type illustrated by FIG. 6. Spool member 104 includes an extension 340 that is secured to the valve actuator 106 and extends through spring 108.

The base 334 is formed to define upstanding sleeve portion 342 in which a suitable snap ring 344 is mounted that forms the spring seat 110 for the spring 108, the other end of which bears directly against the head 346 of actuator 106.

The guide or feeler member 64 has its guide rods 72 incorporated in a guide frame 350 which includes a pair of parallel rods 352 respectively opposing rods 72; the rods 72 and 352 are secured to the feeler member frame 123, as by employing suitable screws 354, and at their upper ends on either side of the torch the rods 72 and 352 are suitably secured to tie bar 358, by suitable screws 360.

The feeler frame member 123 and the tie bars 358 are slidably mounted on the tie rods 260 on either side of the torch body 94, and frame member 123 rests on the laterally extended portions 361 of the torch body end plate 246, in the retracted position of the device (see FIG. 1).

The guide rods 72 at their lower ends have secured thereto the feeler frame member 370 on which the feelers 68 are mounted in the relation indicated in FIGS. 1, 2 and 3.

The individual feelers 68 each comprise a threaded member 372 having a hardened head 374 including a spherically contured contact surface 376. The shanks 378 of the feelers 68 extend through appropriate openings formed in the feeler frame member 370 and are secured in the desired position of adjustment by the nuts 380 and 382 that are disposed on either side of the frame member 370.

It will be noted that the feelers 68 are essentially in coplanar relation and can be adjusted vertically of the feeler member 370 as part of the set up of the apparatus to adapt an operating embodiment of the invention for flame cutting purposes.

The seat or abutment 122 comprises threaded member 384 extending through an appropriate opening formed in the frame member 123 and adapted to be secured in a desired position of adjustment by suitable nuts 386 and 388. Member 384 in the form shown is formed with head 390 the upper surface 392 of which is engaged by the end 394 of the valve actuator 106, to position the valve spool 104 at its null position when the nozzle 41 is suitably spaced from the workpiece in effecting the set up of the apparatus for flame cutting operations.

It will thus be seen that adjustment of the assembly to set the nozzle at the desired elevation above the workpiece with the servo valve disposed at its null position can involve adjustments of both the feeler 68 and the seat 122.

It will therefore be seen that the invention provides a flame cutting torch and guide assembly providing for automatic adjustment of the height of the nozzle 41 above the workpiece as the feelers 68 encounter variations in the elevation of surface contour of the workpiece top surface 70. The feeler or guide member 64 is of light weight and rests directly on the workpiece.

The feeler or guide member 64 is also subject to the downward bias exerted by the valve compression spring 108, which in the case of the illustrated specific embodiment is intended primarily to keep the valve actuator 106 in engagement with seat 122.

The feeler or guide member 64 is thus free of the weight of the torch per se., this being supported by the cylinder structure 92 and associated parts through the hydraulic pressure liquid involved in the hydraulic system.

The hydraulic system per se. may be of any suitable type assuming the double acting operation contemplated and the general arrangement of the mechanical type servo valve 102 to be the governing factors involved. Obviously, the application of the hydraulic pressure liquid on the intake side of the valve 102, in its basic form as illustrated in FIG. 6 may be of any suitable nature to achieve the vertical adjustment necessary of the torch body 94 under the guiding action of the feeler or guide device 64.

The spacing of the feelers 68 at the indicated equally spaced multiple positions about the nozzle, together with the coaxial relation of the torch body and nozzle with respect to each other and to the supporting cylinder structure 92 insures an accurate feeling or guiding action as the feelers are available at multiple positions on either side of the torch for engagement with any workpiece the top surface variations from horizontal positioning that would affect the spacing of the nozzle with respect to the workpiece. The general arrangement involved as incorporated in a commercial embodiment can maintain the spacing of the nozzle discharge end from the workpiece within an 0.002 inch tolerance.

While the invention has been disclosed in association with a flame cutting machine, the invention is equally applicable to plasma cutting equipment, such as the thermal Arc brand cutting torches made and sold by Thermal Dynamics Corporation of West Lebanon, N.H. In using such equipment, torch body 94 would be modified to incorporate plasma cutting torch structures of this general type.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

I claim:

1. In a cutting apparatus comprising a cutting torch mounted on a wheeled frame riding on a trackway for torch cutting of a work piece positioned for torch cutting along the path of movement of the frame and means for moving the frame along the trackway, the improvement wherein said torch comprises:

a cylinder structure including means for mounting same in a vertical position on the frame, a torch body mounted in said cylinder structure for reciprocating movement axially and vertically of said cylinder structure and including a nozzle at the lower end of said torch body, a sensing device carried by said torch and comprising:

a feeler member having a plurality of feelers disposed in uniformly spaced apart relation about said nozzle, said feeler member being mounted for a lost motion movement range axially of said cylinder structure relative to said nozzle, and hydraulic means for supporting said torch body from said cylinder structure and for moving same axially of said cylinder structure, said hydraulic means including a hydraulic system for positioning said torch body relative to said cylinder structure to dispose said nozzle at a predetermined spacing above the work piece with said feelers resting on the work piece and said feeler member disposed in its said lost motion range to provide the operative position of said torch body for torch cutting purposes, and means for translating movement of said feeler member in its said lost motion range due to elevational changes in the work piece into adjustment of said flow orienting means to maintain said nozzle at said spacing above the work piece, on movement of the frame along the trackway for torch cutting purposes, said cylinder structure and said torch body comprising a hydraulic cylinder and piston device forming a part of said hydraulic means with said cylinder and piston device being connected in double acting relation in said hydraulic system for said positioning of said torch body relative to said cylinder structure.

2. The assembly set forth in claim 1 wherein:

said flow orienting means comprises a servo valve having a first torch body retracting position, wherein said pressure liquid flow is directed to position said torch body relative to said cylinder structure whereby said torch body is retracted above its said operative position in an inoperative position, a null position, wherein said translating means is operative to effect said adjustment of said flow orienting means, and a second torch body extending position wherein said pressure liquid flow is directed to extend said torch body toward its operative position, and including means for selectively moving said servo valve between said first and second positions.

3. The improvement set forth in claim 1 wherein:

said nozzle is coaxial with said cylinder and piston device.

4. The improvement set forth in claim 3 wherein:

said servo valve is carried by said cylinder structure and comprises a valve member movable between said servo valve positions and formed to provide said pressure liquid flow orienting, said selective moving means comprising:

means for biasing said valve member to said second position, and means for moving said valve member to said first position against the actions of said biasing means.

5. The improvement set forth in claim 1 wherein:

said feelers comprise hardened buttons adapted for sliding engagement with the work piece, said feelers being substantially equally spaced from said nozzle.

6. The improvement set forth in claim 5 wherein:

said means for moving said valve member comprises:

a yoke reciprocably mounted on said cylinder structure and operatively engaging said valve member with a lost motion connection, solenoid means for acting on said yoke to move same to permit said biasing means to move said valve member to said second position by accommodation of said lost motion connection, and means for biasing said yoke to move said valve member through said lost motion connection to said first position thereof against the biasing action of said valve member biasing means.

7. The improvement set forth in claim 6 wherein:

said feeler member includes an abutment positioned to be engaged by said valve member to dispose the latter in its said null position.

8. In a cutting apparatus comprising a cutting torch mounted on a frame movable along a trackway for torch cutting of a work piece positioned for torch cutting along the path of movement of the frame and means for moving the frame along the trackway, the improvement wherein said torch comprises:

a cylinder structure including means for mounting same in a vertical position on the frame, a torch body mounted in said cylinder structure for reciprocating movement axially and vertically of said cylinder structure and including a nozzle at the lower end of said torch body, a sensing device carried by said torch and comprising:

a feeler member having a plurality of feelers disposed in spaced apart relation about said nozzle, said feeler member being mounted for a lost motion movement range axially of said cylinder structure relative to said nozzle, and hydraulic means for supporting said torch body from said cylinder structure and for moving same axially of said cylinder structure, said hydraulic means including a hydraulic system for positioning said torch body relative to said cylinder structure to dispose said nozzle at a predetermined spacing above the work piece with said feeler member resting on the work piece and disposed in its said lost motion range to provide the operative position of said torch body for torch cutting purposes, said hydraulic system including a hydraulic pressure liquid and hydraulic pressure liquid flow orienting means controlling the flow of the hydraulic pressure liquid to effect said supporting, moving and positioning of said torch body, and means for translating movement of said feeler member in its said lost motion range due to elevational changes in the work piece into adjustment of said flow orienting means to maintain said nozzle at said spacing above the work piece, on movement of the frame along the trackway for torch cutting purposes, said cylinder structure and said torch body comprising a hydraulic cylinder and piston device forming a part of said hydraulic means with said cylinder and piston device being connected in double acting relation in said hydraulic system for said positioning of said torch body relative to said cylinder structure.

* * * * *